Oct. 31, 1967

J. VINCENDON 3,350,068

MATERIAL PROCESSING APPARATUS

Filed Aug. 11, 1966

INVENTOR
JEAN VINCENDON
BY
John J. Hart
ATTORNEY

INVENTOR
JEAN VINCENDON

INVENTOR
JEAN VINCENDON
BY
John J. Hort
ATTORNEY

United States Patent Office 3,350,068
Patented Oct. 31, 1967

3,350,068
MATERIAL PROCESSING APPARATUS
Jean Vincendon, Isere, France, assignor to Etablissements Neyrpic, Grenoble, France, a corporation of France
Filed Aug. 11, 1966, Ser. No. 571,770
8 Claims. (Cl. 259—3)

ABSTRACT OF THE DISCLOSURE

A rotary material processing cylinder supported on two aligned pairs of rubber tired wheels, and having a pair of outwardly projecting, annular flanges arranged in adjacently spaced relation on the central portion of the cylinder between the wheels, the flanges being engaged on their outer side faces by a pair of horizontal rubber tired wheels located within the area defined by said two pairs of cylinder supporting wheels. The wheel axles, the differential unit and motor associated with the wheels are mounted on a readily transferable unitary frame base to provide a unitized readily movable unit separate from the rotary cylinder.

---

This invention relates to material processing apparatus of the rotating drum type, such as, ball or rod mills, tube mills, rotary washing machines and dryers, rotary kilns, etc.

The working cylinders in apparatus of the indicated type, are often mounted on rollers with or without plain or pneumatic tires, and in some instances on rubber tired wheels.

The principal purpose of the present invention is to provide improved apparatus of the indicated type in which the rotary cylinders thereof are mounted on solid or pneumatic tired wheels of standard type and driven through standard truck differentials.

Another object of the invention is to provide improved apparatus of the indicated type having rotary cylinders so constructed that they may be utilized to process hot materials without danger to the rubber tires of the driving wheels.

A further object of the invention is to provide improved apparatus of the indicated type in which the rotary cylinders and driving means therefor are constructed to enhance the flexibleness of the feed and discharge of such apparatus.

A still further object of the invention is to provide an improved apparatus of the indicated type which is readily transported and can be rapidly installed at its place of operation at a minimum of cost.

Other objects of the invention, as well as the advantages and novel features of construction thereof, will be ascertained from the following description, when read in connection with the accompanying drawings, in which FIG. 1 is a vertical sectional view of a roll mill embodying the invention;

Figure 1:
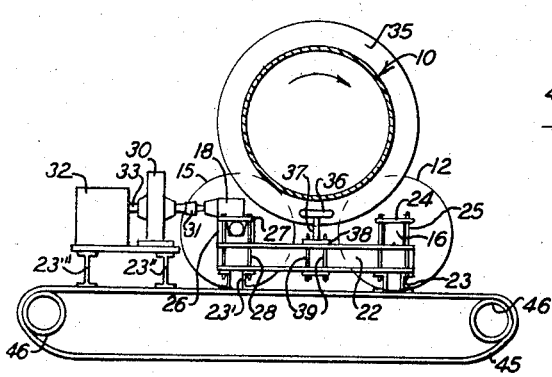

In the drawings, the numeral 10 indicates generally a mill tube or drum of usual construction. Drums of this type are of large diameter and length, for example, 52″ inside diameter and 10′7″ long, and are built in thick welded steel plate, with reinforcing ribs, and an interior lining of cast manganese steel or other abrasive resisting material. Provided in these drums are suitable means for grinding the particular material to be processed, such as hard steel rods.

The drum 10 is rotatably supported by wheels 12, 13, 14 and 15 provided on two spaced axles disposed in parallelism with the longitudinal center-line of such drum. There may be a single wheel provided on each end of the two axles, but it is preferred whenever the wheels are fitted with pneumatic tires; as shown, that the wheels be of the dual type such as provided on trucks, as a safety precaution. Thus, should one of the tires fail for any reason the tire paired therewith will assume the load and thereby prevent the tube mill from tipping over.

The two axles are preferably also of the type that are standard with trucks. Thus the bearer axle 16 is a standard trailer axle of square cross-section. The driving axle is composed of the back axle assembly usually found on trucks, and comprises two aligned half-shafts 19, 19 extending through axle casings 17, 17 and driven by a common differential gear unit 18. As is customary, the differential 18 includes a central driven pinion for transmitting the torque to the two sets of wheels 14, 15 on the half shafts 19, 19 in such a way that the two wheel sets are not rigidly connected to one another and their angular velocity may vary as required to match rolling conditions at the ends of the drum 10. Thus, the differential will even out any slight differences that may exist between the right and left-hand wheel speeds due to slight local out-of-roundness of the mill cylinder surface, thereby enabling the drum to be left in a rough unfinished condition, or due to unequal tire pressures, or to oscillation of the drum while it is rotating. The differential therefore ensures a complete absence of slip between the tires and their track on the cylinder, which in the case of the apparatus shown in FIGS. 1–5, is the drum surface, with the result that there is less tire wear. The driving axle assembly selected should of course be capable of supporting the load in the drum 10, and be able to transmit a torque large enough to drive the drum 10 in its fully loaded condition. A standard truck driving axle such as disclosed, is of especial advantage in the practice of the invention because it is a fairly inexpensive mass-produced component that is capable of serving both as a bearing axle and a transmission and reduction unit. This becomes particularly advantageous when the unit includes a speed reduction unit since this then does away with the need for separate reduction units in the apparatus herein, or at the most requires less speed reduction and therefore cheaper and lighter reduction units.

The driving and bearer axles are mounted upon a frame composed of two lengthwise girders 22, 22 of any suitable construction. For example, each of the girders 22, 22 may be composed of two channel beams arranged with the flanges extending inwardly in opposed relation to provide a girder that is square in cross-section, as indicated in FIGS. 1 to 6. The girders 22, 22 may be mounted on two cross girders 23 and 23', each of which may be composed of two channel beams arranged so that the flanges thereof extend outwardly. The square bearer axle 16 is secured to the top surfaces of one end of the girders 22, 22 by retaining plates 24 and tie bolts 25 secured to the flanges of the underlying beams forming the cross girder 23. The driving axle is mounted on the girders 22, 22 at a place intermediate the lengths thereof and over the cross girder 23'. Special fittings are required to connect the driving axle to the girders 22, 22 and cross-girder 23' because, contrary to the manner of the arrangement of such axle on a truck where the load bears down on the top of the axle casings, the bottom of the driving axle in the construction herein bears down on the frame. Such a fitting includes a specially-shaped seat 26 in FIGS. 1 and 4, plates 27 and tie bolts 28, in FIG. 6; the latter being secured to the flanges of the underlying beams forming the cross girder 32'.

It will be noted that as a result of the aforesaid method of mounting the driving and bearer axles, the wheels 12, 13, 14 and 15 carried thereby will be kept clear of the base of the apparatus. Further, since the differential unit 18 both transmits the driving torque and gears-down the speed, it can be connected directly to the motor drive in certain cases; especially where it incorporates its own reduction gearing. If it does not incorporate its own reduction gearing, a fairly small separate reduction unit 30 is adequate, because as has been previously indicated, a substantial part of the speed reduction is taken care of by the driving axle itself. The output shaft of the reduction unit 30 is coupled to the differential input shaft 31. The mill drive, an electric motor 32, is connected to the input shaft 33 of the reduction gear unit 30.

It will be noted that the drum 10 is provided in its central portion with a pair of spaced, parallel flanges or rings 35 projecting outwardly from the outer surface of the drum at right angles to the axis of rotation of the latter. The exterior or outer side surfaces of the rings 35 are engaged by guide wheels 36 provided with solid rubber tires. The wheels 36 are each mounted on a vertical shaft 37 rotatably supported by a grease lubricated ball bearing unit carried by a supporting plate 38 connected to its associated girder 22 by tie bolts 39.

Figure 2:
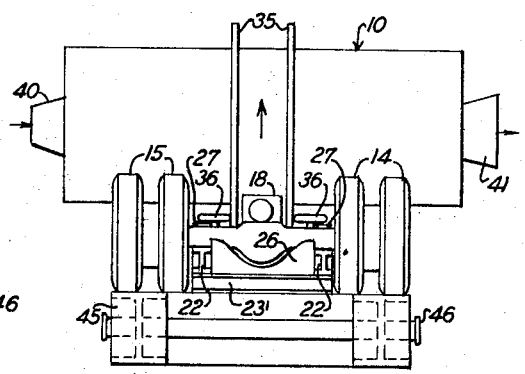
FIG. 2 is a front elevational view of the rotary cylinder or tube shown in FIG. 1.
Figure 5:
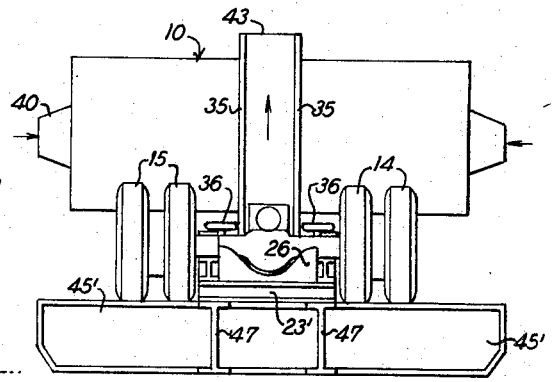
FIG. 5 is a front elevational view of the rotary tube shown in FIG. 4.
Figure 3:
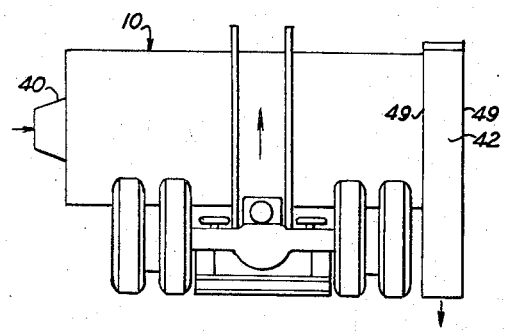
FIG. 3 is a view similar to FIG. 2 and illustrating another method of discharging the tube.
Figure 6:
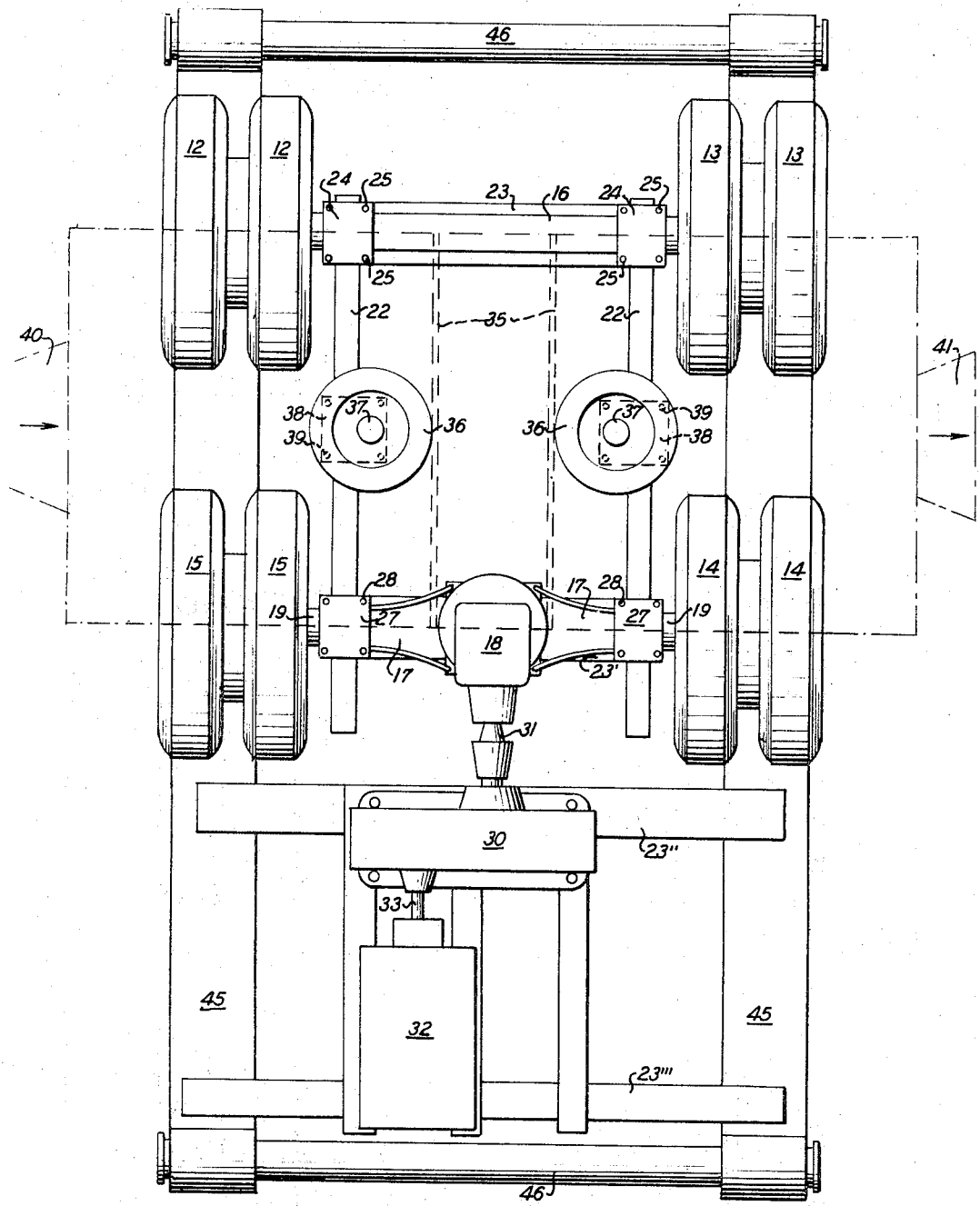
FIG. 6 is a top plan view of the mill shown in FIGS. 1 and 2 with the cylinder shown in dotted outline.
Figure 7:
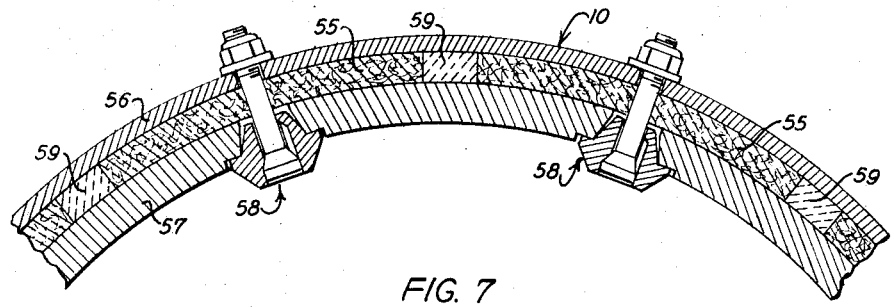
FIG. 7 is a detailed sectional view of a portion of a rotary cylinder provided with an insulating layer in accordance with the invention.

The apparent purpose of the rings 35 and guide wheels 36 is to maintain the cylinder or drum 10 correctly centered with respect to the wheels 12, 13, 14 and 15. As a result of the special arrangement of these parts however, other advantages of an equally important nature are provided. Thus, the fact that the guide means consisting of the aforesaid rings and guide wheels are located between the wheels 12, 13, 14 and 15, make it possible to readily adapt the mill to several alternative feed and discharge set ups. For example, as is shown in FIG. 2 of the drawings, the drum 10 may be provided with removable conically-shaped, inlet and outlet members 40 and 41, respectively, which may be interchanged to establish axial feed and discharge in either direction through the drum; or as shown in FIG. 3, the drum may be provided with a conical inlet 40 for axial feed at one end of the drum and a peripheral hood 42 for downward discharge of the processed material at the other end of the hood, or as shown in FIG. 5, conical inlets 40 may be provided for axial feed at both ends of the drum and a central outlet hood 43 located between the rings 35 for discharge of the drums contents in the center and through the bottom of the apparatus. The rings 35 also stiffen or reinforce the drum 10 in its center and cause the guiding action of the wheels 36 to take place in a rigidified area of the drum. Further, by this arrangement of the rings 35 and guide wheels 36, they are sheltered from shock or collision while the apparatus is in usage, and the clearance at the end faces of the drum is reduced.

The apparatus of this invention is mounted on a base which renders such apparatus a compact unitized machine that is easy movable and transportable and can rapidly be installed where the work is to be performed, thus rendering the unit particularly adaptable for outdoor installations without the necessity of building expensive foundations therefor. Inasmuch as the tires reduce the dynamic forces and vibrations on such base to a very small value, the base can be made light enough and compact enough to effect the ready movability and installation of the same. In accordance with the invention and as is shown more clearly in FIGS. 1, 2 and 6, the base is essentially built in the form of a skid that is composed of two elongated side members 45, 45 of I-beam construction and shaped at their ends to enable them to readily slide over the ground. The members 45, 45 in the embodiment of FIGS. 1 and 2 are disposed transversely to the longitudinal axis of the drum 10. The ends of the members 45, 45 are connected together by two hollow cross bars 46, 46, which provide a rigid skid structure and enable the assembly to be readily connected to devices for moving the same. The skid structure is further rigidified by cross beams which extend across to the two members 45, 45, including the beams 23, 23', 23" and 23'" on which are mounted the beams 22, the bearing and driving axles, the reduction unit 30 and the motor 32.

Figure 4:
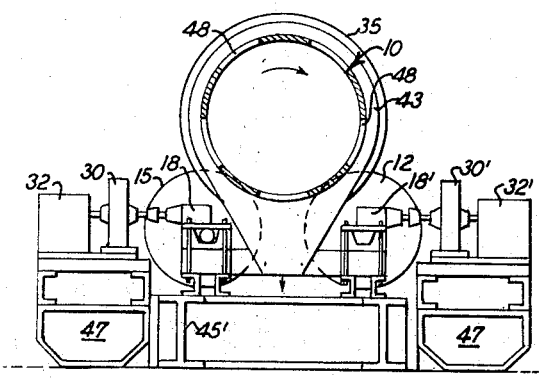
FIG. 4 is a vertical sectional view of the rotary cylinder illustrating a still further method of discharging the same.

FIGS. 4 and 5 of the drawings illustrate how the main side members 45', 45' of the base skid may be disposed in parallelism to the longitudinal axis of the drum 10. When the skid is so incorporated in the assembly, a pair of auxiliary skid members 47 is bolted to at least one of the side members 45', 45' of the main skid to serve as supports for the reduction unit 30 and motor 32 connected to the driving axle. It will be noted however, that in the construction of FIGS. 4 and 5, the bearer axle between the wheels 12, 13 has been replaced by a second driving axle and that the differential 18' thereof is separately connected to a second reduction unit 30' and a second motor 32'. It has been found essential that in constructions in which the drum is driven by two driving axles, both of such axles should be driven by a separate differential unit in order to allow an indispensable slip between the wheels 12, 13 and the wheels 14, 15 due to several causes, such as differences in inflation and wear of the tires. As a result of the second set of driving axle, reduction unit and motor, a second pair of auxiliary skid members 47 is bolted to the other of the side members 45', 45' to serve as a support therefor. Even though only one driving axle is provided for driving the drum 10, two sets of the auxiliary skid members may be employed for the additional steadiness afforded by both pairs of such auxiliary skid members. As will be evident, a pair of auxiliary skid members 47 may be bolted to either one or both of the side members 45, 45 in the skid base shown in FIGS. 1 and 2 of the drawings.

It will also be observed in FIGS. 4 and 5 that the discharge hood 43 has an upper partially cylindrically-shaped portion enclosing the drum 10, and a lower frusto-conically-shaped portion that tapers downwardly beneath the drum and discharges the processed material into a suitable container or pit between the side members 45', 45' of the main skid base. The hood 43 is suitably supported on the main skid base by cross beam means disposed transverse to the members 45', 45' of such base. The material passes from the interior of the drum into the hood 43 through a series of spaced discharge openings 48 formed in the wall portion of the drum between the rings 35 thereof. The hood 42 in the embodiment of FIG. 3 is substantially similar to the hood 43 of FIGS. 4 and 5 except that it is provided with side walls 49, 49 which enable it to stand on the ground. Like the construction of FIGS. 4 and 5 also, the portion of the wall of drum 10 enclosed by the hood 42 is provided with discharge openings in the manner of openings 48.

Referring now to FIGS. 7 to 12 of the drawings which show how the tires 12, 13, 14 and 15 may be protected against damage by materials being processed in the drum 10 while at high temperatures. If the materials being processed are at fairly moderate temperatures, it is preferred that the drum itself be constructed so that there is a layer 55 in FIG. 7 of suitable heat insulating material such as asbestos, fiberglass, or hollow or porous bricks, interposed between the outer drum or tube wall 56 and its inner lining 57 which may be made of a suitable steel, cast-iron plating, or ceramic material. If the inner lining 57 is made of plating, the plates thereof may be maintained in assembled relation by means of the bolting elements generally designated 58 in FIG. 7 of the drawings. If the insulating material is of the type such as asbestos or fiberglass, it is preferred that hard ceramic blocks 59 be provided between the linings 56 and 57 to prevent the crushing of such insulating material. The outer surface of a drum so constructed will be maintained sufficiently cool where there is constant heat dissipation to protect the tires against damage or undue wear.

Figure 8:
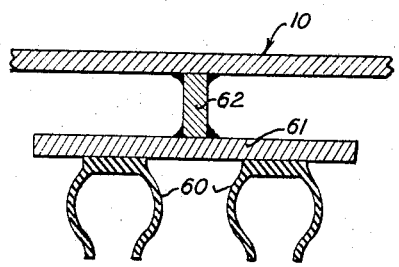
FIG. 8 is a detailed sectional view provided with a rolling track for the tires.
Figure 9:
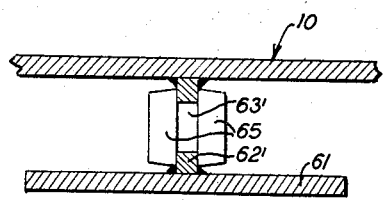
FIG. 9 is a view similar to FIG. 8 showing the track provided with cooling fins.
Figure 10:
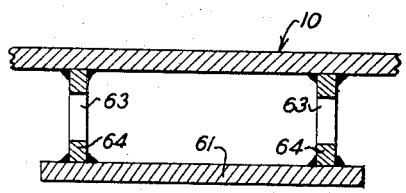
FIG. 10 is a view similar to FIG. 8 showing the track supported on two perforated flanges or rings.
Figure 11:
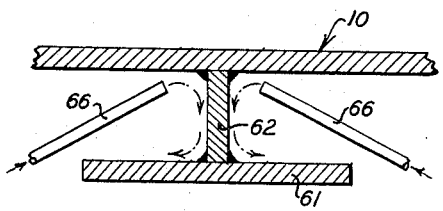
FIG. 11 is a view similar to FIG. 8 showing how the track may be cooled with a coolant.
Figure 12:
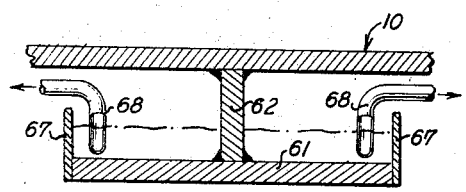
FIG. 12 is a view similar to FIG. 11 showing how the coolant may be retained on the track.

As is shown in FIG. 8 of the drawings, the tires 60 of the wheels may be protected by providing a track 61 for each of the two associated pairs of wheels. Thus the drum 10 will be provided with a track 61 for the pairs of wheels 12 and 15 and a second track 61 for the pairs of wheels 13 and 14. The tracks 61 are connected in spaced relation to the hot wall of the drum 10 and may be connected in such fashion by a ring 62 in FIG. 8, or a pair of rings 64, 64 as is shown in FIG. 10. The cooling effect is enhanced by providing holes in the rings 62, 64, as is illustrated by the holes 63 in the rings 64 in FIG. 10. This cooling effect may be increased as is shown in FIG. 9 by providing the rings 62' with fins 65 in association with the holes 63'. An outside fan could also be used in certain cases. Also the temperature of the tire track may be kept down by directing a liquid coolant thereon, as by atomizing or spraying the coolant onto the track assembly by suitably positioned nozzles, as shown by the nozzles 66, 66 in FIG. 11. As shown in FIG. 12, the coolant which tends to collect at the bottom of the ring 62 under gravity, due to the drive, or friction, or capillarity, and/or due to centrifugal force, may be collected in troughs formed by providing the track 61 with side rings or walls 67, 67. Surplus fluid may be removed from the troughs by any suitable means such as the scoops 68 indicated in FIG. 12.

While there has been illustrated in the drawings and above described by way of example, preferred embodiments in which the invention may be practiced, it will be understood that changes may be made therein without departing from the spirit of the invention or the scope of the appended claims.

What is claimed is:

1. Material processing apparatus comprising a rotary cylinder having an axial feed inlet for the material to be processed in at least one end thereof, a discharge outlet for the material processed in said cylinder, a pair of axles disposed in parallelism with the axis of rotation of said cylinder and located one on each side of said axis, rubber tired wheels on the ends of said axles and rotatably carrying said cylinder, said rubber tired wheels defining an area having a dimension in the direction of said axis of rotation less than the length of said cylinder, at least one of said axles being a driving axle and constituted of two half axles drivenly connected to a differential unit, a motor drivingly connected to said differential unit, a pair of outwardly projecting parallelly arranged annular guide rings provided in adjacently spaced relation on the central portion of said cylinder so as to be located centrally of said area between said rubber tired wheels in the direction of said axis of rotation, a pair of horizontally disposed rubber tired guide wheels located one on each side of said pair of guide rings and engaging the outer side faces of said guide rings, and means supporting said guide wheels for rotational movement about vertical axes within the area defined by said cylinder supporting wheels and between said cylinder supporting wheels both in the direction of said axis of rotation and in the direction at right angles to said axis of rotation.

2. Material processing apparatus as defined in claim 1, including a readily transferable unitary frame base, and means securing said axles, said differential unit, and said motor to said frame base to provide a unitized, readily movable unit separable from said rotary cylinder which is removably carried by said cylinder supporting wheels, and the guide rings of which are detachably engaged by said guide wheels.

3. Material processing apparatus as defined in claim 2, in which said annular guide rings are constituted of a pair of annular flanges connected at their inner peripheries to the cylinder wall and extending outwardlly transversely thereto, and in which said discharge outlet comprises a plurality of circumferentially arranged discharge holes provided in the portion of the cylinder wall between said annular flanges, and a discharge hood located between said flanges and enclosing said cylinder wall portion.

4. Material processing apparatus as defined in claim 2, in which said frame base is in the form of a skid and comprises two elongated spaced beams shaped at their ends to facilitate sliding the frame in the directions of their lengths, and a pair of cross bars fixedly connecting the ends of said spaced beams together, said securing means including cross beams supported by said two elongated beams.

5. Material processing apparatus as defined in claim 2, in which said frame base comprises two elongated spaced beams and a pair of cross bars fixedly connecting the ends of said beams together, and an auxiliary frame unit disposed at right angles to said spaced beams and connected to and projecting outwardly from an intermediate portion of one of said spaced beams.

6. Material processing apparatus as defined in claim 5, in which said frame base includes a second auxiliary frame unit arranged in alignment with said first mentioned auxiliary frame unit, and connected to and projecting outwardly from an intermediate portion of the other of said spaced beams.

7. Material processing apparatus as defined in claim 1, in which said cylinder is provided with a pair of spaced circular tracks spaced outwardly from said annular guide rings so that the latter are located therebetween and encircling said cylinder so that each is engaged by the cylinder supporting wheels on the same end of both of said axles, and means supporting said tracks in spaced relation to the outer wall of said cylinder.

8. Material processing apparatus as defined in claim 7, including cooling means constructed and arranged to direct a coolant between each of said circular tracks and the outer wall of the cylinder.

References Cited

UNITED STATES PATENTS

| | | | |
|---|---|---|---|
| 2,503,686 | 4/1950 | Raypholtz | 259—3 X |
| 2,845,254 | 7/1958 | Howden | 259—3 |
| 3,033,057 | 5/1962 | Gray | 259—175 X |

FOREIGN PATENTS 1,300,065  6/1962  France.

WALTER A. SCHEEL, *Primary Examiner.*

R. W. JENKINS, *Examiner.*